(12) United States Patent
Boge et al.

(10) Patent No.: US 9,174,509 B2
(45) Date of Patent: Nov. 3, 2015

(54) VEHICLE AXLE SUSPENSION SYSTEM

(71) Applicants: Deere & Company, Moline, IL (US); Weber-Hydraulik GmbH, Güglingen (DE)

(72) Inventors: Christof Boge, Telgte (DE); Thilo Kazimiers, Bahretal (DE); Jacek Zatrieb, Güglingen (DE); Benedikt Müller, Herresbach/Amel (BE)

(73) Assignees: Deere & Company, Moline, IL (US); Weber-Hydraulik GmbH, Güglingen (DE)

( * ) Notice: Subject to any disclaimer, the term of this patent is extended or adjusted under 35 U.S.C. 154(b) by 0 days.

(21) Appl. No.: 14/077,753

(22) Filed: Nov. 12, 2013

(65) Prior Publication Data

US 2015/0001825 A1 Jan. 1, 2015

(30) Foreign Application Priority Data

Nov. 12, 2012 (DE) .......................... 10 2012 022 030

(51) Int. Cl.
| | |
|---|---|
| *B60G 17/056* | (2006.01) |
| *B60G 17/04* | (2006.01) |
| *B60G 11/26* | (2006.01) |
| *B60G 21/073* | (2006.01) |
| *B60G 9/02* | (2006.01) |
| *B60G 17/08* | (2006.01) |

(52) U.S. Cl.
CPC ............... *B60G 17/056* (2013.01); *B60G 9/02* (2013.01); *B60G 11/26* (2013.01); *B60G 17/04* (2013.01); *B60G 17/0565* (2013.01); *B60G 17/08* (2013.01); *B60G 21/073* (2013.01); *B60G 2202/154* (2013.01); *B60G 2202/413* (2013.01); *B60G 2202/414* (2013.01); *B60G 2300/082* (2013.01); *B60G 2500/114* (2013.01)

(58) Field of Classification Search
CPC ....... B60G 17/04; B60G 17/056; B60G 11/26
USPC .................... 280/124.112, 124.157, 124.158, 280/124.159, 124.16
See application file for complete search history.

(56) References Cited

U.S. PATENT DOCUMENTS

| | | | | |
|---|---|---|---|---|
| 3,535,945 | A | * | 10/1970 | Bowman .......................... 74/129 |
| 3,558,153 | A | * | 1/1971 | Strauff .................... 280/124.159 |

(Continued)

FOREIGN PATENT DOCUMENTS

| | | |
|---|---|---|
| DE | 19719075 A1 | 11/1998 |
| DE | 10337600 A1 | 3/2005 |

(Continued)

OTHER PUBLICATIONS

European Search Report, dated Jan. 27, 2014 (6 pages).

*Primary Examiner* — Barry Gooden, Jr.
(74) *Attorney, Agent, or Firm* — Collard & Roe, P.C.

(57) ABSTRACT

A suspension system is provided for a movable, supported vehicle axle. The suspension system includes a pair of hydraulic suspension cylinders, which are placed between the vehicle axle and a supporting vehicle structure. Each hydraulic suspension cylinder includes a first work chamber connected to a first pressure accumulator, and a second work chamber connected to a second pressure accumulator. A pressure-limiting valve is exposed to pressure in the first work chamber and has an outlet connected to the second pressure accumulator.

5 Claims, 1 Drawing Sheet

(56) References Cited

U.S. PATENT DOCUMENTS

| | | | |
|---|---|---|---|
| 3,700,396 A * | 10/1972 | Adams | 91/449 |
| 3,945,664 A * | 3/1976 | Hiruma | 280/5.513 |
| 4,378,816 A * | 4/1983 | Peiffer | 137/115.14 |
| 4,589,675 A * | 5/1986 | Braun et al. | 280/6.159 |
| 5,338,010 A * | 8/1994 | Haupt | 267/64.16 |
| 5,348,338 A * | 9/1994 | Kuriki et al. | 280/124.161 |
| 5,529,152 A * | 6/1996 | Hamilton et al. | 188/266.6 |
| 5,647,440 A * | 7/1997 | Barry et al. | 172/311 |
| 5,873,437 A * | 2/1999 | Danek | 188/282.2 |
| 5,915,701 A * | 6/1999 | Heyring | 280/6.155 |
| 6,145,859 A * | 11/2000 | Altherr et al. | 280/124.159 |
| 6,786,492 B2 * | 9/2004 | Brandenburger | 280/5.519 |
| 7,163,208 B2 * | 1/2007 | Brandenburger | 280/6.159 |
| 7,703,616 B2 * | 4/2010 | Rafailovic et al. | 212/289 |
| 7,909,341 B2 * | 3/2011 | Van Der Knaap | 280/124.106 |
| 2002/0007621 A1 * | 1/2002 | Van Der Plas | 56/10.9 |
| 2003/0011162 A1 * | 1/2003 | Wallestad | 280/124.157 |
| 2003/0015846 A1 * | 1/2003 | Rogala et al. | 280/5.514 |
| 2004/0160032 A1 * | 8/2004 | Brandenburger | 280/124.159 |
| 2005/0011190 A1 * | 1/2005 | Bitter | 60/468 |
| 2005/0050886 A1 * | 3/2005 | Bauer et al. | 60/413 |
| 2005/0067239 A1 * | 3/2005 | Bauer et al. | 188/297 |
| 2006/0055129 A1 * | 3/2006 | Amano | 280/5.507 |
| 2007/0278752 A1 * | 12/2007 | Schedgick | 280/5.507 |
| 2008/0251331 A1 * | 10/2008 | Mangelschots et al. | 188/266.6 |
| 2009/0051130 A1 * | 2/2009 | Huth | 280/5.514 |
| 2009/0261541 A1 * | 10/2009 | Huth | 280/5.507 |
| 2013/0081913 A1 * | 4/2013 | Nowaczyk et al. | 188/315 |
| 2014/0015215 A1 * | 1/2014 | Bauer | 280/124.159 |
| 2014/0026969 A1 * | 1/2014 | Helbig et al. | 137/2 |
| 2015/0081178 A1 * | 3/2015 | Billaud et al. | 701/50 |

FOREIGN PATENT DOCUMENTS

| | | |
|---|---|---|
| DE | 102010021777 A1 | 1/2011 |
| EP | 1213504 A2 | 6/2002 |
| EP | 1277604 A2 | 1/2003 |

* cited by examiner

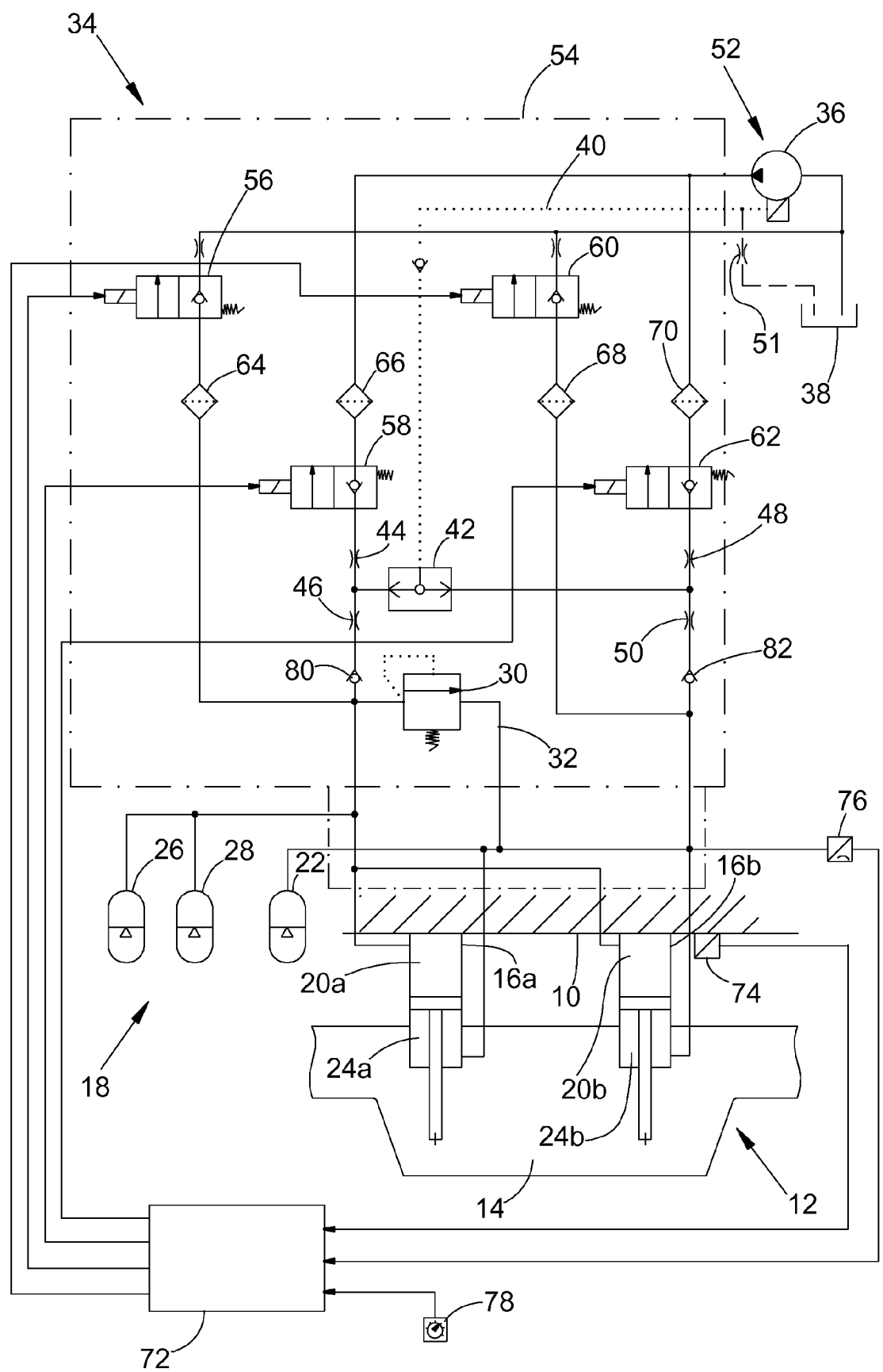

VEHICLE AXLE SUSPENSION SYSTEM

FIELD

The present disclosure relates to a suspension system for a movable, supported vehicle axle.

BACKGROUND

A vehicle axle suspension system is shown in DE 103 37 600 A1. The suspension system comprises a hydraulic suspension cylinder, placed between an oscillating supported vehicle axle and a vehicle structure, for each of the two vehicle sides. The hydraulic suspension cylinder is of a conventional type and has a first work chamber designed as a piston space, and a second work chamber designed as an annular space. Each of the two work chambers is connected to a separate pressure accumulator. In order to protect the hydraulic suspension cylinder from the travel-caused appearance of excess pressure peaks, a pressure-limiting valve connected to the piston space of the hydraulic suspension cylinder is provided, which opens into a low pressure-side hydraulic reservoir of the suspension system via a pressure relief line. Since the line distances to be bridged over between the hydraulic suspension cylinder and the hydraulic reservoir are comparatively long, it is necessary for the pressure relief line to have a sufficiently large inside cross-section. Otherwise, a rapid reduction in pressure of the pressure peaks in the direction of the hydraulic reservoir is not guaranteed.

As a result of the high integration density of modern vehicle surroundings, problems are inevitably produced in the laying of the pressure relief line.

Therefore, it is desired to provide an excess-pressure suspension system adapted to the high integration density of modern vehicle surroundings.

SUMMARY

According to an aspect of the present disclosure, a suspension system for a vehicle axle that is supported so it can move has at least one hydraulic suspension cylinder that can be placed between the vehicle axle and a supporting vehicle structure. The cylinder includes a first work chamber connected to a first pressure accumulator, and a second work chamber connected to a second pressure accumulator. A pressure limiting valve exposed to pressure in the first work chamber is connected to the second pressure accumulator on the outlet side or the low-pressure side.

The invention utilizes the circumstance that the hydraulic suspension cylinder and the two pressure accumulators are generally located near each other in the vehicle. Something similar is valid for the pressure limiting valve, which is located between the two aforementioned components. A bridging over of longer line distances is not needed.

The vehicle axle is, for example, a rigid pendulum axle. The pendulum axle is, in particular, a suspended front axle of an agricultural tractor. Each of the two sides of the pendulum axle is correlated with a separate hydraulic suspension cylinder, so that with a movement of the pendulum axle, the hydraulic suspension cylinder is turned in or turned out in the opposite direction. The first and the second work chambers of the hydraulic suspension cylinders are connected in parallel with the first pressure accumulator or the second pressure accumulator. The hydraulic suspension cylinder is a traditional double-acting cylinder. It should be noted here that a use of the suspension system in accordance with the invention is not limited to a rigid pendulum axle. Rather, it can also be used in connection with a single-wheel suspension.

Preferably, the first and/or second pressure accumulator is a hydraulic accumulator. The hydraulic accumulator includes a pressure vessel which is subdivided into a first and second pressure chamber by a pressure-yielding separation element. The first pressure chamber is connected to the hydraulic suspension cylinder, whereas a gas under pressure, which is in the second pressure chamber, forms a gas spring acting on the separation element. The gas is, as a rule, nitrogen or a gaseous nitrogen compound. Alternatively, the hydraulic accumulator can be a spring-loaded storage container, in which instead of a gas, a mechanically pre-tensionsed spring element acts on the separation element. The separation element is, for example, an elastic membrane made of a suitable rubber mixture, an elastomer balloon, or a metal bellows. Alternatively, however, it is also conceivable to provide for a piston that is supported so it can move within the hydraulic accumulator.

The first pressure accumulator can consist of a parallel connection of two separate pressure accumulators. In this way, it is possible to attain a comparatively slight rise in the spring characteristic in the range of small to medium axle loads, wherein the rise of the spring characteristic increases progressively in the range of high axle loads, as they appear on an agricultural tractor, for example, with the digging of a plough. In the latter case, an improved support of the supporting vehicle structure relative to the ground is guaranteed.

It is possible to connect the first and second work chambers of the hydraulic suspension cylinder by a switching valve arrangement, alternatively with a pressure source or a hydraulic reservoir of a central hydraulic system. By suitable control of the switching valve arrangement, it is therefore possible to purposefully influence the level of the supporting vehicle structure relative to the ground, and/or the spring rate of the suspension system. The switching valve arrangement can be controlled by an electronic control device, which for the regulation of a level that is to be maintained relative to the ground and/or a spring rate that is pre-specified by a higher-level control, in addition to an operator-side position specification, also evaluates the signals of a position sensor and a work pressure sensor placed on the supporting vehicle structure, wherein the latter, in particular, detects a work pressure prevailing in the second work chamber of the at least one hydraulic suspension cylinder.

BRIEF DESCRIPTION OF THE DRAWINGS

The sole FIGURE is a schematic diagram of a suspension system in accordance with the invention.

DETAILED DESCRIPTION OF THE DRAWINGS

Referring to the sole FIGURE, the vehicle axle 12 is supported so it can move relative to a supporting vehicle structure 10 and is a rigid pendulum axle 14. The pendulum axle 14 is a suspended front axle of the agricultural tractor. Each of the two sides of the pendulum axle 14 is correlated with a separate hydraulic suspension cylinder 16a, 16b. The hydraulic suspension cylinders 16a, 16b are placed between the pendulum axle 14 and the supporting vehicle structure 10, designed as a frameless vehicle chassis, by means of corresponding articulated connections. With a movement of the pendulum axle 14, the hydraulic suspension cylinders 16a, 16b are turned in or turned out in opposite directions.

The cylinders 16a, 16b are traditional, double-acting hydraulic cylinders. Cylinders 16a, 16b include first or upper work chambers 20a, 20b connected to a first pressure accumulator 18, and second or lower work chambers 24a, 24b connected to a second pressure accumulator 22. The first pressure accumulator 18 connected to the first work chambers 20a, 20b consists of a parallel connection of two separate pressure accumulators 26, 28, wherein they preferably have coinciding suspension characteristics.

The two pressure accumulators 18, 22 are hydraulic accumulators. Each of the hydraulic accumulators includes a pressure vessel, which is subdivided into a first and second pressure chamber by a pressure-yielding separation element in the shape of an elastic membrane. The first pressure chamber is connected to the hydraulic suspension cylinders 16a, 16b, wherein a pressurized gas in the second pressure chamber forms a gas spring that acts on the separation element. The gas is nitrogen or a gaseous nitrogen compound.

In order to protect the hydraulic suspension cylinders 16a, 16b from the travel-caused excess pressure peaks, a pressure-limiting valve 30 is provided. Pressure-limiting valve 30 is exposed to pressure on the side of the first two work chambers 20a, 20b, which is connected to the second pressure accumulator 22 of the suspension system 34 on the side of the outlet or on the low-pressure side via a pressure relief line 32. The pressure-limiting valve 30, in a first embodiment, is a pressure sequence valve, which has a spring-loaded valve slide, whose spring space is connected to the ambient atmosphere or a hydraulic reservoir 38 on the low-pressure side, wherein the spring-loaded valve slide is moved into an opened position when a specific hydraulic pressure on the inlet side on the order of magnitude of 250 bar is exceeded. In a second embodiment, the pressure-limiting valve 30 is a traditional model. The suspension chamber of the pressure-limiting valve 30 is in this case internally connected to the pressure relief line 32.

Moreover, a pressure source such as a variable displacement pump 36 is provided. The variable displacement pump 36 is supplied from the hydraulic reservoir 38 on the low-pressure side and is controlled in a known manner by means of a sensor line 40, which via a shuttle valve 42, transmits a control pressure derived from the work pressure of the first work chambers 20a, 20b or the second work chambers 24a, 24b to the variable displacement pump 36. Several throttle valves 44, 46, 48, and 50 stabilize the control pressure to be transmitted via the sensor line 40 to the variable displacement pump 36. An additional throttle valve 51 is used for the pressure relief of the sensor line 40 in the direction of the hydraulic reservoir 38 on the low-pressure side.

The variable displacement pump 36 is, like the hydraulic reservoir 38 also, a component of a central hydraulic system 52, which is used to operate other hydraulic vehicle systems, such as a hydraulic vehicle steering and hydraulic wheel brakes.

A switching valve system 54 makes it possible to purposefully influence the level of the supporting vehicle structure 10 relative to the ground and the spring rate of the suspension system 10. To this end, the first and second work chambers 20a, 20b, 24a, and 24b of the hydraulic suspension cylinders 16a, 16b can be connected either to the variable displacement pump 36 or the hydraulic reservoir 38 by means of several electrically actuatable 2/2-way valves 56, 58, 60, and 62.

A plurality of filter elements 64, 66, 68, 70 is used to prevent undesired function impairments of the switching valve arrangement 54 as a result of impurities contained in the hydraulic fluid.

The suspension system 34 is shown in a basic state provided for the work operation of the agricultural tractor. All 2/2-way valves 56, 58, 60, ad 62 are in their closed position, so that an inflow of hydraulic fluid from the variable displacement pump 36 as well as its outflow in the direction of the hydraulic reservoir 38 is stopped. There is merely a constant pressure replacement connection between the work chambers 20a, 20b, 24a, and 24b of the hydraulic suspension cylinders 16a, 16b and the corresponding pressure accumulators 18, 20. In other words, the suspension system 34 has in its basic state the function of a common front axle suspension.

The switching valve arrangement 54 is controlled by an electronic control device 72, which for the regulation of a level to be maintained relative to the ground and/or a suspension rate specified by a higher-level control, in addition to a position specification on the operator side, evaluates the signals of a position sensor 74 and a work pressure sensor 76 placed on the supporting vehicle structure 10. For example, the work pressure sensor 76 detects the work pressure prevailing in the second work chambers 24a, 24b of the hydraulic suspension cylinders 16a, 16b. The position specification on the driver side thereby takes place by means of an operating element 78 provided in a vehicle cab of the agricultural tractor.

If the level of the supporting vehicle structure 10 relative to the ground should be raised, then the electronic control device 72 first opens the 2/2-way valve 58. As a result of the control pressure rise thereby appearing in the sensor line 40, the variable displacement pump 36 causes the conveyance of hydraulic fluid standing under increased pressure into the first work chambers 20a, 20b of the hydraulic suspension cylinders 16a, 16b, wherein the supporting structure 10 is raised. A spring-loaded check valve 80 prevents a flowing off of hydraulic fluid from the first work chambers 20a, 20b of the hydraulic suspension cylinders 16a, 16b, leading to an undesired work pressure decline.

At the same time, the work pressure rises in the opposite second work chambers 24a, 24b of the hydraulic suspension cylinders 16a, 16b, wherein upon reaching a threshold value of the work pressure detected by means of the work pressure sensor 76 on the order of magnitude of 87 bar, the 2/2-way valve 60 is opened, so as to make possible a pressure relief of the second work chambers 24a, 24b by conducting away hydraulic fluid in the direction of the hydraulic reservoir 38.

If, on the other hand, the level of the supporting vehicle structure 10 relative to the ground should be lowered, then the electronic control device 72 first opens the 2/2-way valve 56, so that the variable displacement pump 36 conveys hydraulic liquid standing under pressure into the second work chambers 24a, 24b of the hydraulic suspension cylinders 16a, 16b, and the supporting vehicle structure 10 is lowered due to the inflow of the hydraulic fluid. A spring-loaded, check valve 82 hereby prevents a flowing away of hydraulic fluid from the second work chambers 24a, 24b of the hydraulic suspension cylinders 16a, 16b, leading to an undesired work pressure decline.

At the same time, the work pressure rises in the opposite first work chambers 20a, 20b of the hydraulic suspension cylinders 16a, 16b, wherein upon reaching a threshold value of the work pressure detected by means of the work pressure sensor 60 on the order of magnitude of 87 bar, the 2/2-way valve 62 is opened, so as to make possible a flowing away of hydraulic fluid in the direction of the hydraulic reservoir 38.

The raising or lowering process described above takes place as long the supporting vehicle structure 10 has reached the desired pressure corresponding to the position specification on the driver's side. The latter is recognized by the electronic control device 72 by evaluation of the signals made available by the position sensor 74. Afterwards, the suspension system 34 is set back to its basic state by closing the two 2/2-way valves 58, 60 or 56, 62.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A suspension system for a movable, supported vehicle axle, having a hydraulic suspension cylinder connected between the axle and a supporting vehicle structure, wherein the hydraulic suspension cylinder includes a first work chamber connected to a first pressure accumulator, and a second work chamber connected to a second pressure accumulator, wherein:

a pressure-limiting valve is exposed to pressure in the first work chamber and is connected on an outlet side to the second pressure accumulator by a pressure relief line, wherein excess pressure flows from the outlet side of the pressure-limiting valve to the second pressure accumulator in order to protect the hydraulic suspension cylinder from travel-caused excess pressure peaks.

2. The suspension system of claim 1, wherein:

one of the pressure accumulators is a hydraulic accumulator.

3. The suspension system of claim 1, wherein:

the first pressure accumulator comprises a parallel connection of two separate pressure accumulators.

4. The suspension system of claim 1, wherein:

the first work chamber or the second work chamber of the hydraulic suspension cylinder is connected by a switching valve arrangement alternatively to a pressure source or to a hydraulic reservoir of a central hydraulic system.

5. The suspension system of claim 1, wherein:

the pressure-limiting valve is a pressure sequence valve.

* * * * *